United States Patent
Ward

(10) Patent No.: US 11,876,987 B2
(45) Date of Patent: Jan. 16, 2024

(54) VIDEO ENCODER AND ENCODING METHOD

(71) Applicant: DOLBY LABORATORIES LICENSING CORPORATION, San Francisco, CA (US)

(72) Inventor: Gregory John Ward, Berkeley, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 419 days.

(21) Appl. No.: 17/295,404

(22) PCT Filed: Nov. 15, 2019

(86) PCT No.: PCT/US2019/061627
§ 371 (c)(1),
(2) Date: May 19, 2021

(87) PCT Pub. No.: WO2020/106559
PCT Pub. Date: May 28, 2020

(65) Prior Publication Data
US 2022/0007040 A1    Jan. 6, 2022

Related U.S. Application Data

(60) Provisional application No. 62/769,223, filed on Nov. 19, 2018.

(30) Foreign Application Priority Data

Nov. 19, 2018 (EP) ..................................... 18207029

(51) Int. Cl.
H04N 19/85    (2014.01)
H04N 23/73    (2023.01)
(Continued)

(52) U.S. Cl.
CPC ............. *H04N 19/31* (2014.11); *H04N 5/265* (2013.01); *H04N 19/176* (2014.11);
(Continued)

(58) Field of Classification Search
CPC .. H04N 23/698; H04N 23/741; H04N 23/743; H04N 23/951; H04N 25/50–59
(Continued)

(56) References Cited

U.S. PATENT DOCUMENTS 10,984,505 B2    4/2021    Ward
10,991,281 B2    4/2021    Ward
(Continued)

FOREIGN PATENT DOCUMENTS

EP    2579591    4/2013
WO    2017146972    8/2017
(Continued)

OTHER PUBLICATIONS

Nayar, S. et al. "High Dynamic Range Imaging: Spatially Varying Pixel Exposures" IEEE Conference on Computer Vision and Pattern Recognition, Jun. 13, 2000, pp. 472-479.
(Continued)

*Primary Examiner* — Anthony J Daniels

(57) ABSTRACT

An image sensor includes a plurality of pixels, each pixel belonging to one of N subframes each characterized by (a) a same exposure-time sequence that includes a short exposure-time alternating with a long exposure-time, and (b) a respective temporal offset equal to a multiple of the short exposure-time. A method for encoding a video stream captured by the image sensor includes (i) for each subframe, linearly combining a long-exposure image, captured at the long exposure-time, and a short-exposure image, captured at the short exposure-time, to yield a residual image, (ii) combining at least some of the long-exposure images from
(Continued)

the N subframes to yield a full-frame image having a higher resolution than any long-exposure image, (iii) encoding the full-frame image into a base layer of the video stream, and (iv) encoding at least some of the residual images from the N subframes into an enhancement layer of the video stream.

15 Claims, 7 Drawing Sheets

(51) Int. Cl.
*H04N 19/31* (2014.01)
*H04N 19/182* (2014.01)
*H04N 5/265* (2006.01)
*H04N 19/46* (2014.01)
*H04N 19/176* (2014.01)

(52) U.S. Cl.
CPC .......... *H04N 19/182* (2014.11); *H04N 19/46* (2014.11); *H04N 19/85* (2014.11); *H04N 23/73* (2023.01)

(58) Field of Classification Search
USPC .................................................. 348/207.99
See application file for complete search history.

(56) References Cited

U.S. PATENT DOCUMENTS

| | | | |
|---|---|---|---|
| 2013/0083838 A1* | 4/2013 | Touze .................... | H04N 19/33 375/E7.026 |
| 2014/0003528 A1* | 1/2014 | Tourapis ................ | H04N 19/33 375/240.16 |
| 2014/0177706 A1* | 6/2014 | Fernandes .............. | H04N 19/59 375/240.03 |
| 2014/0270543 A1 | 9/2014 | Zhang | |

FOREIGN PATENT DOCUMENTS

| | | |
|---|---|---|
| WO | 2020051305 | 3/2020 |
| WO | 2020051361 | 3/2020 |
| WO | 2020055907 | 3/2020 |

OTHER PUBLICATIONS

Segall, A. et al."Video Coding for the Mobile Capture of Higher Dynamic Range Image Sequences" Picture Coding Symposium May 2009, pp. 1-4.

Yun Q. Shi, et al."Image and Video Compression for Multimedia Engineering: Chapter 16 Digital Video Coding Standards—MPEG ½ Video" in "Image and Video Compression for Multimedia Engineering: Chapter 16 Digital Video Coding Standards—MPEG ½Video" Jan. 1, 1999, pp. 1-34.

* cited by examiner

504(0) → $c_{ij} = 0$ 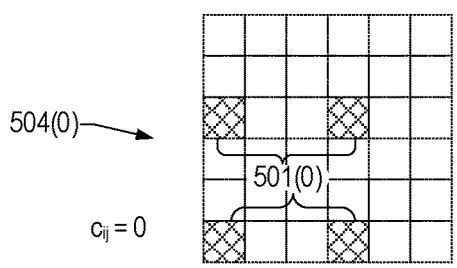
504(0) → $c_{ij} = 0$ 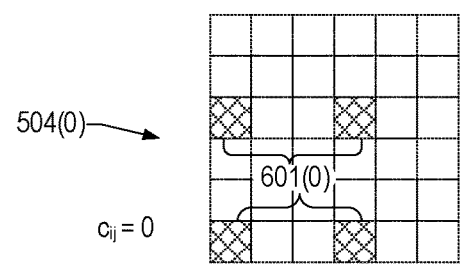
504(1) → $c_{ij} = 1$ 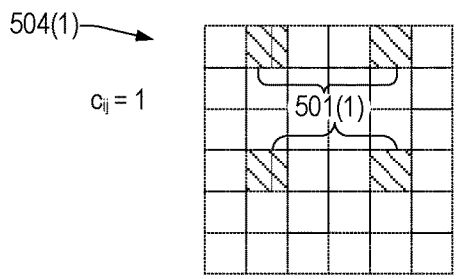
504(1) → $c_{ij} = 1$ 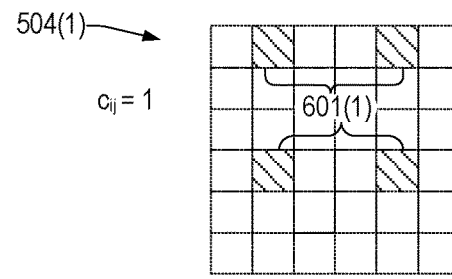
504(2) → $c_{ij} = 2$ 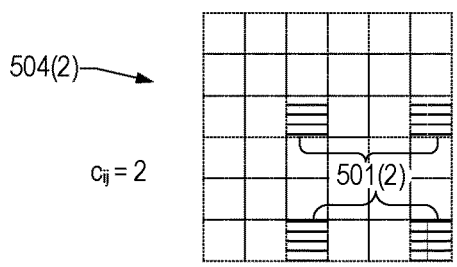
504(2) → $c_{ij} = 2$ 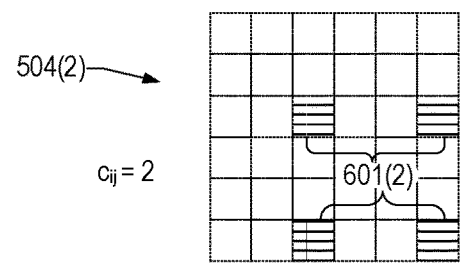
504(3) → $c_{ij} = 3$ 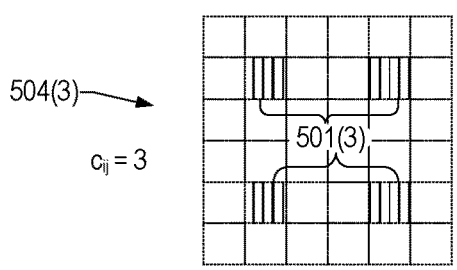
504(3) → $c_{ij} = 3$ 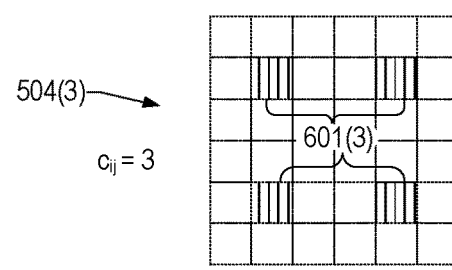
504(8) → $c_{ij} = 8$ 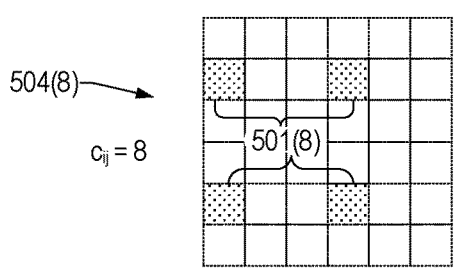
504(8) → $c_{ij} = 8$ 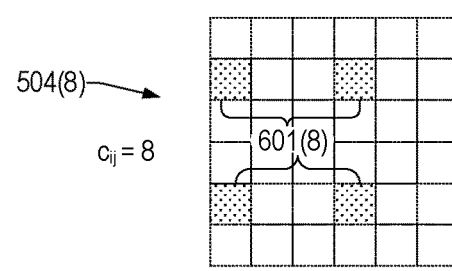
FIG. 5
FIG. 6

VIDEO ENCODER AND ENCODING METHOD

CROSS-REFERENCE TO RELATED APPLICATIONS

This application claims the benefit of priority from U.S. Patent Application No. 62/769,223 filed Nov. 19, 2018 and European Patent Application No. 18207029.2 filed Nov. 19, 2018, which are hereby incorporated by reference in its entirety.

BACKGROUND

The apparent motion of objects displayed in films and video results from an optical illusion in which a sequence of still images, or frames, are displayed at a frame rate faster than a human viewer can distinguish them as distinct images. This frame rate is known as a flicker fusion threshold. Higher frame rates generally result in smoother perceived motion. However, images captured for high-frame-rate display are captured at short exposure times, which results in reduced resolution of such images due to reduced light incident on the sensor media, and simultaneously, the greater the cost of data transport. Increased exposure time enables greater detail to be captured within an individual image, but this occurs at the expense of blurred motion. Thus, with a single speed of exposure there is a tradeoff between capturing details of a scene and accurately capturing motion within the scene.

SUMMARY OF THE EMBODIMENTS

In a first aspect, a method for encoding a video stream captured by an image sensor is disclosed. The image sensor includes a plurality of pixels, each pixel belonging to one of N subframes each characterized by (i) a same exposure-time sequence that includes a short exposure-time alternating with a long exposure-time, and (ii) a respective temporal offset equal to an integer multiple of the short exposure-time. The method includes, for each of the N subframes, linearly combining a long-exposure low-resolution image, captured at the long exposure-time, and a short-exposure low-resolution image, captured at the short exposure-time, to yield a subframe residual image. The method also includes combining at least some of the long-exposure low-resolution images from the N subframes to yield a full-frame long-exposure image having a higher resolution than any long-exposure low-resolution image. The method also includes (i) encoding the full-frame long-exposure image into a base layer of the video stream, and (ii) encoding at least some of the subframe residual images from the N subframes into an enhancement layer of the video stream.

In a second aspect, a video encoder for encoding a video stream captured by an image sensor is disclosed. The image sensor includes the plurality of pixels of the first aspect. The video encoder includes a memory and a microprocessor communicatively coupled to the memory. The memory stores non-transitory computer-readable instructions and is adapted to store image data captured by the image sensor. The microprocessor is adapted to execute the instructions to execute the method of the first aspect.

BRIEF DESCRIPTION OF THE FIGURES

FIG. 5 is a schematic illustration of subframes and associated short-exposure pixel-values generated by a respective plurality of pixels during respective short-exposure time intervals of FIG. 4, in an embodiment.

FIG. 6 is a schematic illustration of subframes and associated long-exposure pixel-values generated by a respective plurality of pixels during respective long-exposure time intervals of FIG. 4, in an embodiment.

DETAILED DESCRIPTION OF THE EMBODIMENTS

Figure 1:
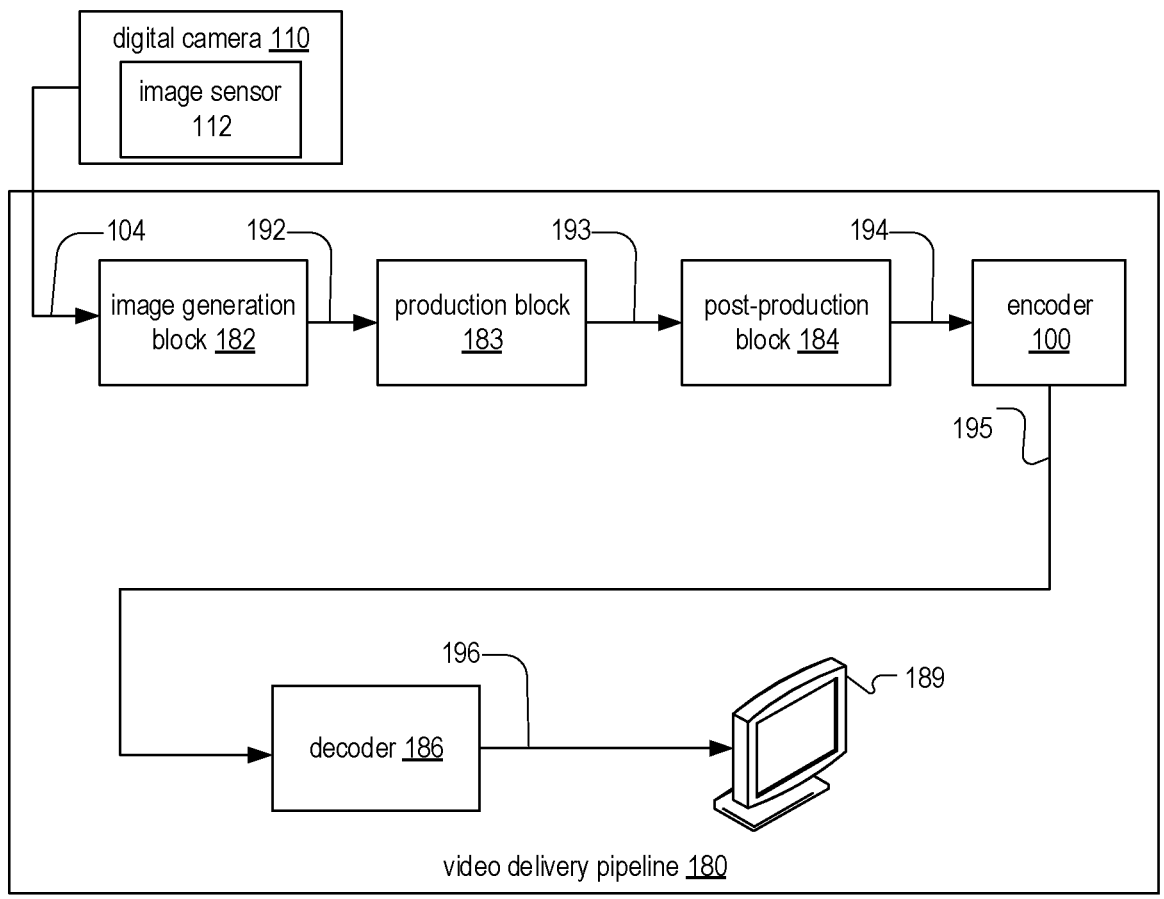
FIG. 1 depicts a video encoder receiving video data captured by an image sensor of a camera, in an embodiment.

FIG. 1 depicts a video delivery pipeline 180 showing various stages from video capture to video content display. Video delivery pipeline 180 includes at least one of an image generation block 182, a production block 183, a post-production block 184, a video encoder 100, and a decoder 186. FIG. 1 also includes a digital camera 110 communicatively coupled to video delivery pipeline 180. Digital camera 110 includes an image sensor 112 that generates video frames 104 received by image generation block 182, which outputs video data 192. In a production block 183, video data 192 is edited to provide a video production stream 193.

The video data of video production stream 193 is then provided to a processor at a post-production block 184 for post-production editing. Following post-production at post-production block 184, video data of unencoded video data 194 may be delivered to video encoder 100 for delivering downstream to decoding and playback devices such as televisions, personal computers, mobile devices, set-top boxes, movie theaters, and the like. Video delivery pipeline 180 may lack at least one of blocks 182, 183, and 184, in which case unencoded video data 194 may be equal to one of video production stream 193, video data 192, and video frames 104. In certain embodiments, such as mobile applications, production block 183 and/or post-production block 184 may be removed or simplified based on the capabilities of digital camera 110, which may be part of a mobile device such as a phone or a tablet.

In some embodiments, encoder 100 may include audio and video encoders, such as those defined by ATSC, DVB, DVD, Blu-Ray, and other delivery formats, to generate a coded bit stream 195. Coded bit stream 195 is decoded by a decoder 186 to generate a decoded signal 196 representing an identical or close approximation to unencoded video data

194. A target display 189 may display decoded signal 196. Target display 189 may be a reference monitor, computer monitor or display, a television set, a head-mounted display, a virtual retinal display, or the like. Target display 189 may be part of a mobile device such as a phone or a tablet.

Digital camera 110 may capture video frames 104 at a high frame-rate. High-frame video may be hampered by bandwidth and noise issues. Generally, the larger number of pictures captured increases the amount of bits per second sent down the pipeline, thus affecting bandwidth, and the higher frame-rates translate to shorter exposure times and increased noise associated with the picture. However, high frame-rate video allows a reduction of motion artifacts such as judder and excessive blurring.

Judder occurs when untracked motion is represented by short exposures separated by some time Δt (e.g., using a 30° shutter that is open for ¹⁄₁₂th of the frame time). The moving object flashes one place, and then again in a different place, and high-contrast edges or silhouettes appear to flash where their motion should be smooth.

"Smooth pursuit" describes motion that is of interest to and tracked by the viewer, and is an estimate of viewer visual tracking and may be quantified by a smooth pursuit vector. To determine the smooth pursuit vector, an eye movement vector is subtracted from a local image motion vector, and regions where significant eye and object motion vectors cancel correspond to smooth pursuit. Partially canceling vectors may be used to change the local shutter time proportionally.

Judder artifacts may be avoided by using a more open shutter. However, a 360° shutter may allow motion to be captured during the frame duration, resulting in smearing the motion and causing excessive blurring. Current video content is a compromise between these shutter extremes, and thus less than optimal.

High frame-rate video overcomes some of these issues by presenting more frames per second than standard video. However, it comes at a cost due to the additional information that is transmitted and displayed. Many LCD displays cannot refresh effectively at more than 120 frames per second (fps), and they get less energy-efficient and photon-efficient at higher refresh rates. Even at 120 fps, which translates to four to five times the data bandwidth of standard video, judder and excessive motion blur are apparent in some content. Eliminating judder and blur may entail a frame rate in excess of 400 fps, which is about seventeen times the bandwidth of today's movies. The instant disclosure may provide a higher frame rate without the associated cost in bandwidth and display technology.

Figure 2:
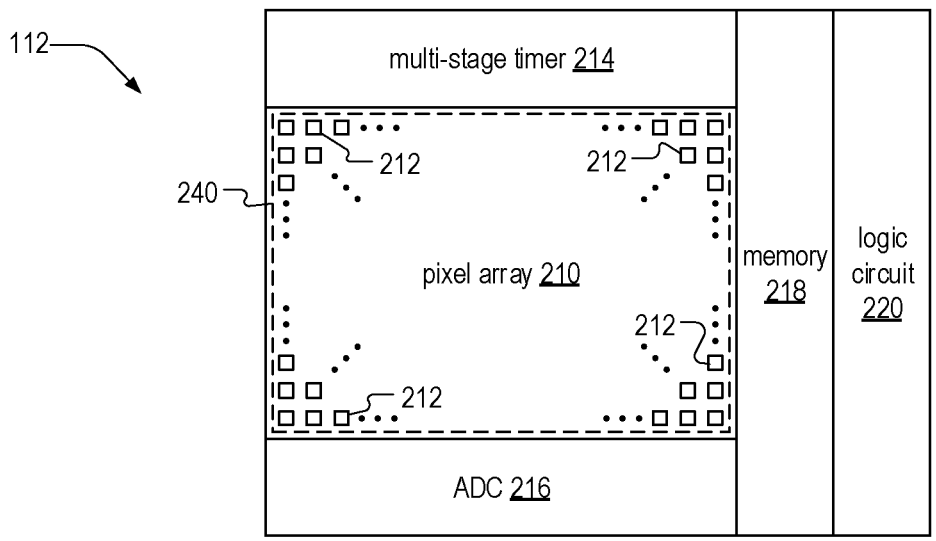
FIG. 2 is a detailed schematic of the image sensor of FIG. 1, in an embodiment.

FIG. 2 is a detailed schematic of image sensor 112. Image sensor 112 includes a pixel array 210 formed of a plurality of pixels 212. Each pixel 212 belongs to one of N subframes of pixel array 210. Herein, integer N is referred to as a "subframe count," and may be a positive integer, such as a square number. Each subframe is characterized by (i) a same exposure-time sequence that includes a short exposure-time $\tau_1$ alternating with a long exposure-time $\tau_2 > \tau_1$, and (ii) a respective temporal-offset $\Delta t_j$ equal to an integer multiple of the short exposure-time $\tau_1$. In other words, the same exposure-time sequence is used for all subframes, and each subframe is associated with a respective temporal-offset $\Delta t_j$. Subframe count N may be determined such that (N−1) is an integer closest to the quotient $\tau_2/\tau_1$. Alternatively, the number of subframes N may at least in part determine one or both of exposure times $\tau_1$ and $\tau_2$ such that $\tau_2/\tau_1 = N$.

Image sensor 112 may include a color filter array 240, which includes a plurality of color filters each aligned to a respective pixel 212 of pixel array 210. Color filter array 240 may be a Bayer array, with each filter transmitting a spectral band of electromagnetic radiation corresponding to one of red, green, and blue light. Hereinafter, a pixel aligned beneath a color filter that transmits a spectral band may be prefixed by the color corresponding to the spectral band. For example, red pixels 212, green pixels 212, and blue pixels 212 are beneath, and detect light transmitted by, a red color filter, a green color filter, and a blue color filter, respectively. Pixel-values generated by red pixel 212, a green pixel 212, and a blue pixel 212 may be referred to herein as red pixel-values, green pixel-values, and blue pixel-values, respectively. A pixel value, is, for example, an integer in the range of zero to $2^M - 1$, where M is the pixel's bit depth.

Subframe count N may also be an integer multiple of the number of different color filter types of color filter array 240. When color filter array includes three color filter types, red, green and blue, or cyan, magenta and yellow, for example, subframe count N may be an integer multiple of three. In an embodiment, subframe count N=9. For speed and precision of scaling binary pixel values captured at long and short exposure times, the quotient $\tau_2/\tau_1$ may be equal to a power of two. In an embodiment, at least one of the following conditions holds: (i) N is an integer multiple of the number of color filter types in color filter array 240; (ii) (N−1) is an integer closest to the quotient $\tau_2/\tau_1$; and (ii) the quotient $\tau_2/\tau_1$ equals a power of two. For example, N may equal nine while $\tau_2/\tau_1$ may equal eight.

A multi-stage timer 214 is coupled to pixel array 210 and configured to trigger, for each of the subframes, a sequence of at least two exposures of different capture duration of the pixels of said subframe. The sequences corresponding to different subframes are triggered in a predetermined order, with start times of subsequent sequences being temporally offset by temporal-offset $\Delta t_j$. The sequences have the same overall duration and each temporal-offset $\Delta t$ is smaller than said overall duration.

At least one analog to digital converter (ADC) 216 is coupled to pixel array 210 and converts the at least two exposures of each subframe to digital pixel values. A memory 218 is coupled to the at least one ADC 216 to store the digital pixel values. A logic circuit 220 is coupled to memory 218 and determines for each pixel 212 which of the corresponding stored digital pixel values to upload to a video frame. Logic circuit 220 may scale, e.g. multiply, the stored digital pixel values based upon the different exposure durations, e.g. on the basis of a ratio of $\tau_1$ and $\tau_2$. For example, when pixels 212 are exposed according to sequences comprising a short exposure of duration x and a long exposure of duration $\tau_2 = k \cdot \tau_1$, the stored digital pixel value of the short exposure is scaled by multiplying by k or the stored digital pixel value of the long exposure is scaled by multiplying by $k^{-1}$.

Figure 3:
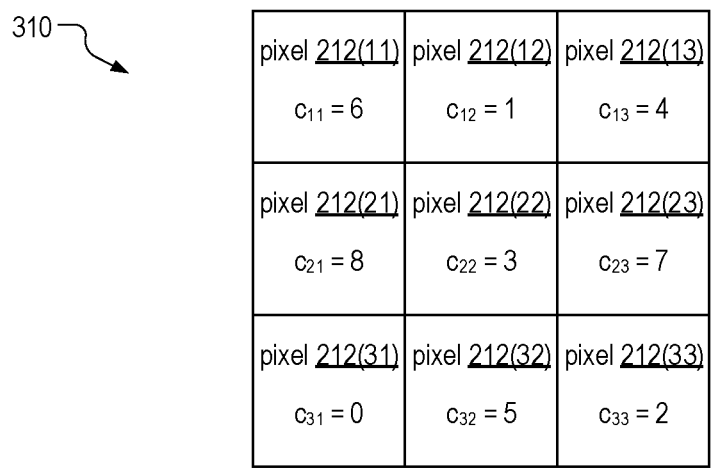
FIG. 3 is a schematic of a pixel sub-array of the image sensor of FIG. 2, and corresponding temporal offset coefficients, in an embodiment.

FIG. 3 is a schematic of a pixel sub-array 310. In the examples of FIGS. 3-6, subframe count N=9, but N may take on a different value, without departing from the scope hereof. Pixel array 210 of image sensor 112 is divided into a plurality of sub-arrays 310. Pixel sub-array 310 includes pixels 212 arranged in S rows and T columns. In the depicted example, S=T=3. However, without departing from the scope hereof, either one of S and T may take on a different value. Pixel array 210 may include a periodic tiling, a tessellation for example, of a plurality of pixel sub-arrays 310. Each pixel 212 of pixel sub-array 310 is associated with a respective temporal-offset coefficient $c_{ij}$, and hence is denoted as pixel 212$(i,j)$ in FIG. 3. Indices i and j are integers that range from 1 to S and 1 to T, respectively. Each pixel 212 associated with a same temporal-offset coefficient $c_{ij}$ belong to the same subframe of pixel array 210.

Multi-stage timer 214 may determine the value of each temporal-offset coefficient $c_{ij}$. Temporal-offset coefficient $c_{ij}$ is, for example, an integer in the range of zero to N. Accordingly, each temporal-offset coefficient $c_{ij}$ indicates one of N subframes of pixel array 210, and hence is also referred to herein as a "subframe index."

Temporal-offset coefficients $c_{ij}$ constitute a temporal-offset matrix C that has dimensions S×T. Temporal-offset matrix C defines which pixel 212 belongs to which of the N=S×T subframes. Pixels of each pixel subarray 310 of pixel array 210 are assigned to subframes according to temporal-offset matrix C. Pixels 212 of each subframe may be distributed substantially uniformly over the sensor area. In an embodiment, video frames 104 are captured and/or transmitted at a frame rate of $\mathcal{F}$ frames per second (fps), where the shortest exposure duration (e.g., $\tau_1$) of the pixels is $N^{-1}$ of the total frame time. When N=9 and $\mathcal{F}$=30 fps, the short exposure-time is 1/270 seconds.

The shortest exposure duration may be the same as the temporal-offset between the sequences. In the exemplary embodiment depicted in FIG. 3, there may be N=S×T=9 time offsets represented in the image, from zero seconds (when $c_{ij}$=0) to 8/270 seconds (when $c_{ij}$=8). Offsets may be represented by approximately, or exactly, 1/N of the pixel population, where adjacent pixels may have different offsets, differing by an integer multiple of $(NF)^{-1}$. The disclosure applies to any frame rate, for example, those specified by the Movie Picture Experts Group (MPEG).

The offset placement in temporal-offset matrix C is arbitrary, but the results may show less aliasing if the offsets are well-mixed in the sense that adjacent subframe index values of neighboring tiles in pixel subarray 310 have good temporal separation, e.g., at least 2Δt. For example, temporal-offset matrix C is constructed such that any two horizontally adjacent pixels and any two vertically adjacent pixels of pixel array 210 are not immediately following each other in the predetermined order in which the sequences trigger these pixels.

Based on this assessment, a simple scan-line ordering is undesirable. Furthermore, temporal-offset matrix C may be rotated, shifted, or scrambled on a frame-by-frame basis to reduce the "screen door effect." So long as temporal-offset matrix C is sent as metadata with a video frame 104, or derivable from a known sequence with a specified starting point, the offsets are easily recovered. Scrambling temporal-offset matrix C on a frame-by-frame basis may allow a dither pattern to be hidden from view.

Figure 4:
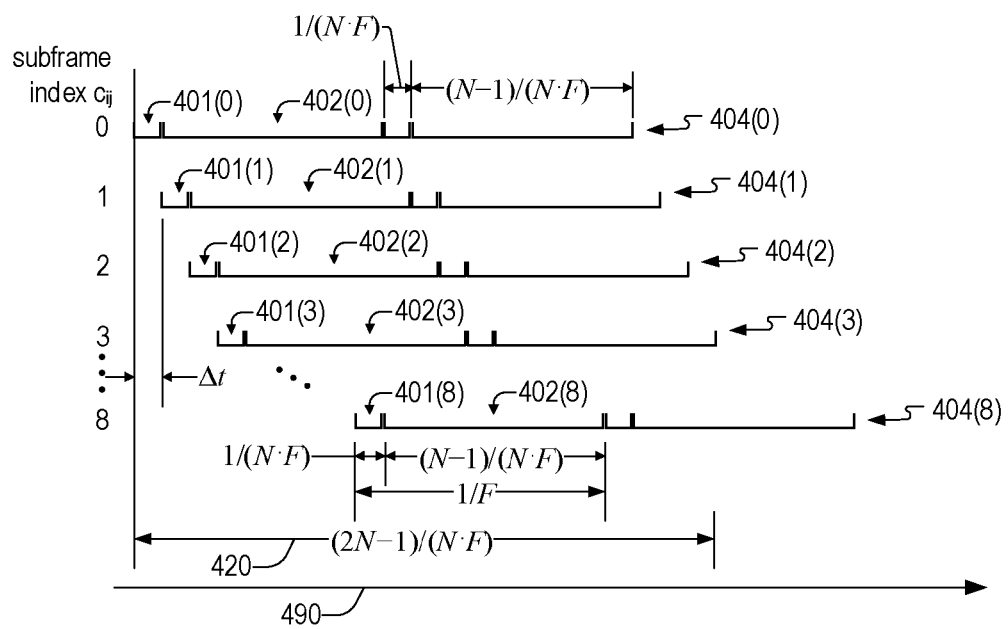
FIG. 4 is a schematic illustration of N capture timings corresponding to respective subframes 1–N of the pixel sub-array of FIG. 3, in an embodiment.

FIG. 4 is a schematic illustration of capture timings 404 corresponding to a respective subframe 310 of pixel array 210. The exemplary capture timings 404(0, 1, 2, 3, 8) depicted in FIG. 4 correspond to subframe indices $c_{ij}$ equaling zero, one, two, three, and eight, respectively, of the exemplary pixel sub-array 310 depicted in FIG. 3. While multi-stage timer 214 may control individual pixels 212 to have one of N capture timings 404 (e.g., 9 capture timings 404 for the example depicted in FIGS. 3 and 4), FIG. 4 does not illustrate capture timings 404(4-7) for clarity of illustration.

In the example of FIG. 4, N=9 and each sequence includes short exposure-time $\tau_1$ and long exposure-time $\tau_2$. The sequences are identical, but temporally offset by temporal offset $\Delta t = (N\mathcal{F})^{-1}$, where $\mathcal{F}^{-1}$ is the frame duration. When $\mathcal{F}^{-1}$=1/30 seconds and N=9, $\Delta t$=1/270 seconds. In the depicted example, short exposure-time $\tau_1$ equals temporal offset $\Delta t$ and long exposure-time $\tau_2$ equals $(N-1)/(N\mathcal{F})$.

FIG. 4 also illustrates a time interval 420, which corresponds to the time between the start of time interval 401(0) and the end of time interval 402(8). Time interval 420 has a duration $(2N-1)/(N\mathcal{F})$. FIG. 2 denotes a plurality of short-exposure time intervals 401 and a plurality of long-exposure time intervals 402 during time interval 420. Time interval 401 begins at time $t_0$ indicated on a time axis 490 that indicates temporal sequencing of events occurring after time $t_0$. Time intervals 401 and 402 have respective durations $\tau_1$ and $\tau_2$ and are indexed by subframe index $c_{ij}$, which indicates the temporal sequencing of time intervals 401 and 402. For example, time interval 401(1) begins after the start of time interval 401(0).

Pixels 212 belonging to one of the N subframes generate short-exposure pixel-values during respective short-exposure time intervals 401 and generate long-exposure pixel-values during respective long-exposure time intervals 402.

FIG. 5 is a schematic illustration of subframes 504 each corresponding to a respective subframe of pixel array 210. Video data 194 generated by image sensor 112 may include subframes 504.

Subframes 504(0, 1, 2, 3, 8) correspond to subframe indices $c_{ij}$ equaling zero, one, two, three, and eight respectively, and have associated respective capture timings 404(0, 1, 2, 3, 8), illustrated in FIG. 4. While image sensor 112 may be configured to generate all N subframes, FIG. 5 does not illustrate subframes 504(4-7) for clarity of illustration.

Each subframe 504 includes a plurality of short-exposure pixel-values 501 generated by a respective plurality of pixels 212 during respective short-exposure time intervals 401. For example, subframe 504(0) includes short-exposure pixel-values 501(0) corresponding to pixels sensing light during time interval 401(0). Similarly, subframe 504(1) includes short-exposure pixel-values 501(1) generated during time interval 401(1). Locations of pixel-values $501(c_{ij})$ correspond to the values of $c_{ij}$, which comprise temporal-offset matrix C, superimposed onto pixel sub-array 310, FIG. 3.

For simplicity of illustration, each subframe 504 is depicted within two-by-two tiling of pixel sub-arrays 310. Each subframe 505 may include pixel values spanning a larger tiling of pixel-subarrays 310, for example, a tiling having the same pixel dimensions of pixel array 210.

FIG. 6 is a schematic illustration of subframes 504 and an associated plurality of long-exposure pixel-values 602 generated by a respective plurality of pixels 212 during respective long-exposure time intervals 402. For example, subframe 504(0) includes long-exposure pixel-values 602(0) corresponding to pixels sensing light during time interval 402(0). Similarly, subframe 504(1) includes long-exposure pixel-values 602(1) each generated during time interval 402(1).

While pixel-values of FIGS. 5 and 6 that share a same reference numeral $501(c_{ij})$ correspond to a pixel 212 sensing light during the same time interval, $401(c_{ij})$, the actual pixel-values themselves may differ according to the intensity of light incident on the pixel. That is, the use of a single reference numeral, e.g., 501(0) to indicate pixel-values generated by multiple pixels of the same subframe index $c_{ij}$ is not meant to convey that each of the multiple pixels generates the same pixel value.

Figure 7:
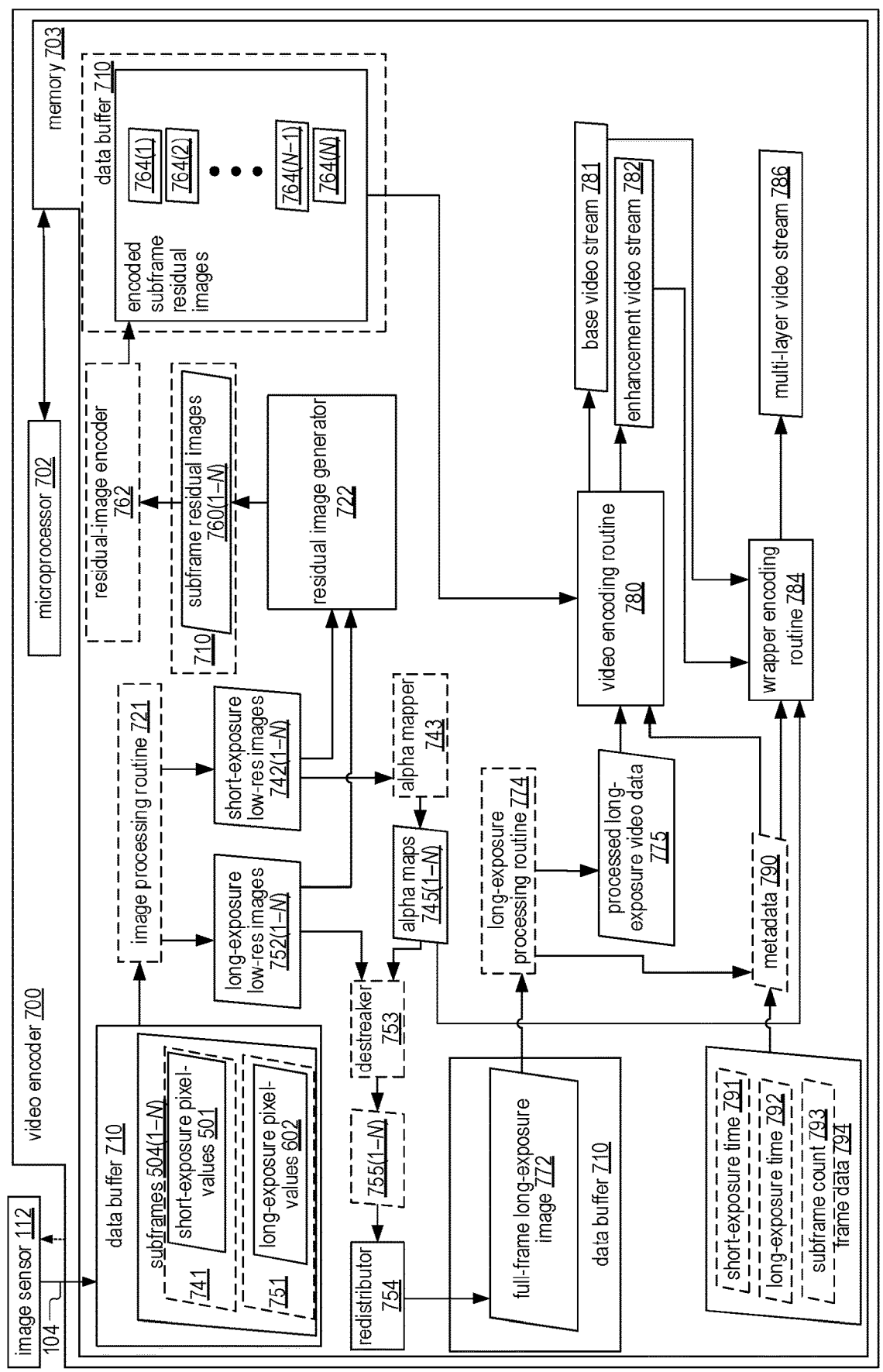
FIG. 7 is a schematic block diagram of a first video encoder configured to generate a multi-layer video stream from unencoded video data received from the image sensor of FIG. 1, in an embodiment.

FIG. 7 is a schematic block diagram of a video encoder 700 configured to generate a multi-layer video stream 786 from unencoded video data 194. Video encoder 700 is an example of video encoder 100, FIG. 1. Video encoder 700 may include at least one of a microprocessor 702 and a memory 703 communicatively coupled thereto. Memory 703 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 703 may be integrated into microprocessor 702.

Memory 703 may include a data buffer 710, which may have thirteen bits of precision and store ten-bit analog-to-digital output. Data buffer 710 stores subframes 504, which include short-exposure pixel-values 501 and long-exposure pixel-values 602 introduced in FIGS. 5 and 6. Data buffer 710 may also store a plurality of encoded subframe residual images 764 and a full-frame long-exposure image 772. Data buffer 710 may include one or more distinct data buffers such that at least one of subframes 504, encoded subframe residual images 764, and full-frame long-exposure image 772 are stored in a respective dedicated data buffer. Each dedicated data buffer may have a different word length. Short-exposure pixel-values 501 and long-exposure pixel-values 602 may be stored in respective distinct data buffers.

Data buffer 710 may have sufficient bits of precision such that short-exposure pixel-values 501 or long-exposure pixel-values 602 may be scaled by a ratio or exposure times $\tau_1$ and $\tau_2$ without losing precision. The scaling may include a bit-shift operation, e.g., when pixel-values 501 and 602 are stored as binary data. For example, bit depth $M_{710}$ of data buffer 710 may exceed bit depth $M_{104}$ of video frames 104 by at least $\lceil \log_2(\tau_2/\tau_1) \rceil$, where $\lceil \cdot \rceil$ is a ceiling operator. Bit depth $M_{710}$ may equal $M_{104}+\lceil \log_2(\tau_2/\tau_1) \rceil$. For example, when $M_{104}=10$ and $\tau_2/\tau_1=8$, $M_{710}=13$. Bit depth $M_{710}$ may be a word length of data buffer 710. Unencoded video data 194 may have a bit-depth equal to bit depth $M_{104}$.

Full-frame long-exposure image 772 may be stored in a ten-bit data buffer, which may be an ultra-high definition (UHD) buffer and have dimensions that correspond to a 4K resolution, where the horizontal resolution is at least 3840 pixels. The buffer storing low-resolution images 742 and 752 may have dimensions equal to the dimensions of pixel array 210 scaled by a factor $N^{-1/2}$, which corresponds to the dimensions of low-resolution images 742 and 752. For example, when pixel array 210 has dimensions 3840×2160 and N=9, each of low-resolution images 742 and 752 may be stored in a buffer with dimensions 1280×720.

When short-exposure pixel-values 501 and long-exposure pixel-values 602 are generated by red, green, and blue pixels 212, pixel-values 501 and 602 include corresponding red, green, and blue pixel-values, respectively. Red pixel-values, green pixel-values, and blue pixel-values of short-exposure pixel-values 501 may be stored in respective sections of data buffer 710 to facilitate denoising and block compression. Similarly, red pixel-values, green pixel-values, and blue pixel-values of long-exposure pixel-values 602 may be stored in respective sections of data buffer 710.

Memory 703 may also store software configured to read and transform data stored in data buffer 710. The software includes machine-readable instructions executable by microprocessor 702 to implement functionality of video encoder 700. The software may include at least one of an image processing routine 721, a residual image generator 722, an alpha mapper 743, a destreaker 753, a redistributor 754, a residual-image encoder 762, a long-exposure processing routine 774, an encoding routine 780, and a wrapper encoding routine 784. Each of image processing routine 721 and long-exposure processing routine 774 may include one or more data processing routines and/or subroutines.

Memory 703 may also store intermediate data generated by the software in the process of generating a multi-layer video stream 786 from unencoded video data 194. This intermediate data may include at least one of: short-exposure low-resolution images 742, alpha maps 745, long-exposure low-resolution images 752, destreaked images 755, subframe residual images 760, encoded subframe residual images 764, full-frame long-exposure image 772, processed long-exposure video data 775, base video stream 781, enhancement video stream 782, and metadata 790.

Short-exposure pixel-values 501 of a subframe 504($c_{ij}$) may be stored in data buffer 710 as a short-exposure low-resolution image, e.g., short-exposure low-resolution image 741($c_{ij}$). Similarly, long-exposure pixel-values 602 of a subframe 504($c_{ij}$) may be stored in data buffer 710 as a long-exposure low-resolution image, e.g., long-exposure low-resolution image 751($c_{ij}$).

Memory 703 may also store frame data 794, which may include at least one of a short-exposure time 791, a long-exposure time 792, and subframe count 793. Short-exposure time 791, long-exposure time 792, and subframe count 793 are equivalent to, respectively, previously introduced short exposure-time $\tau_1$, short exposure-time $\tau_2$, and integer N.

Figure 8:
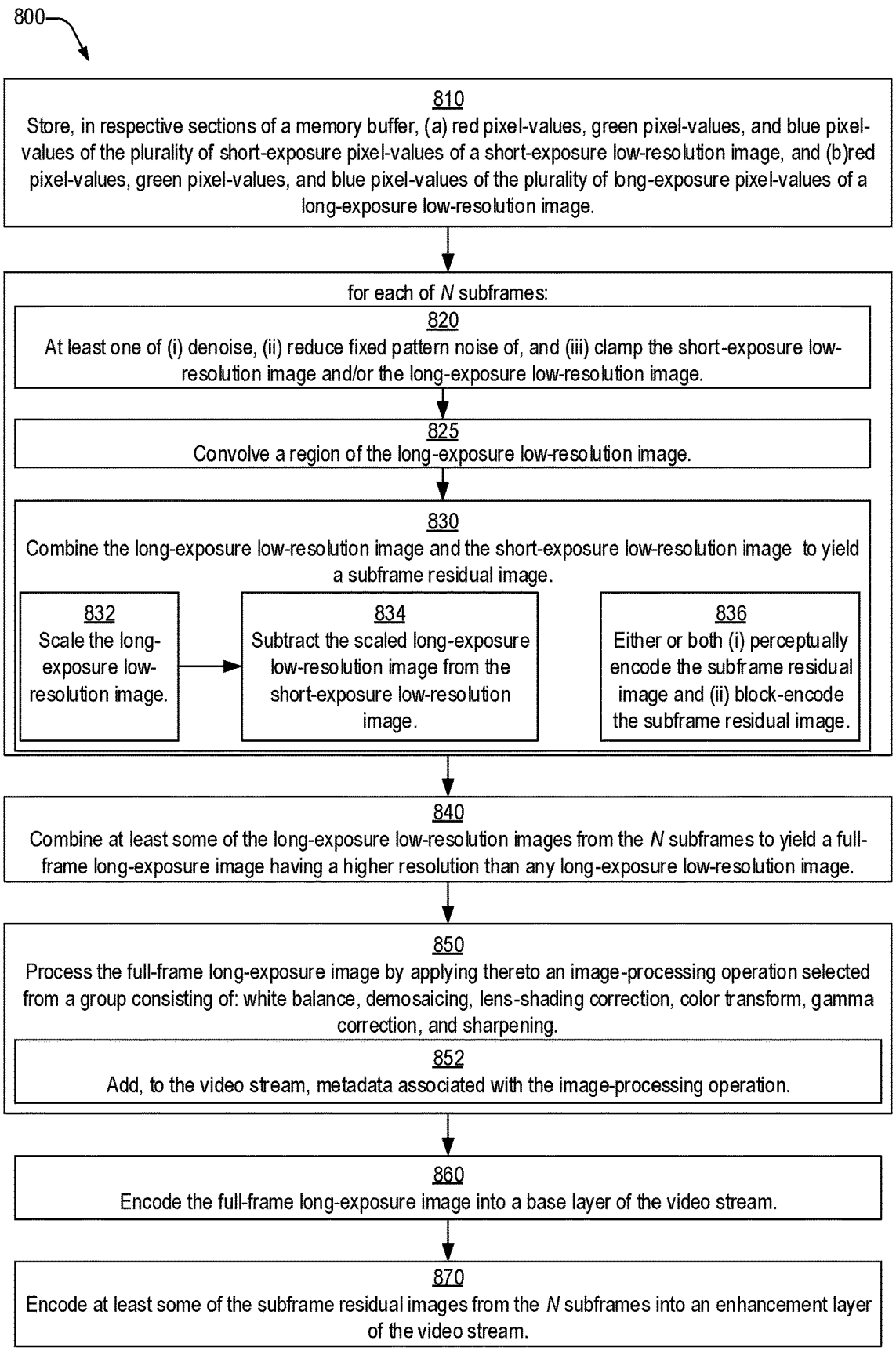
FIG. 8 is a flowchart illustrating a first method for encoding a video stream with the video encoder of FIG. 7, in an embodiment.

FIG. 8 is a flowchart illustrating a method 800 for encoding a video stream captured by image sensor 112. By combining a base video stream derived from long-exposure images with an enhancement video stream derived from short-exposure images, method 800 generates an encoded video stream having a temporal resolution of high frame-rate video while lacking the aforementioned cost of increased bandwidth associated with traditional high frame-rate video. Method 800 may be implemented within one or more aspects of video encoder 700, FIG. 7. Method 800 may be implemented by microprocessor 702 executing computer-readable instructions stored in memory 703.

In the following description of method 800, each pixel 212 of image sensor 112 belongs to one of N subframes each characterized by (i) a same exposure-time sequence (e.g., one of capture timings 404) that includes short exposure-time 791 alternating with long exposure-time 792, and (ii) a respective temporal offset Δt equal to an integer multiple of short exposure-time 791. Method 800 includes at least one of steps 810, 820, 825, 830, 840, 850, 860, and 870.

Image sensor 112 may be configured to capture a long-exposure low-resolution image (e.g., image 751), captured at a long exposure-time, and a short-exposure low-resolution image (e.g., image 741), captured at a short exposure-time. The short-exposure low-resolution image includes short-exposure pixel-values 501; the long-exposure low-resolution image includes long-exposure pixel-values 602, for example.

Step 810 includes storing, in respective sections of a memory buffer, red pixel-values, green pixel-values, and blue pixel-values of the plurality of short-exposure pixel-values. Step 810 also includes storing, in respective sections of the memory buffer, red pixel-values, green pixel-values, and blue pixel-values of the plurality of long-exposure pixel-values. In an example of step 810, red pixel-values, green pixel-values, and blue pixel-values of short-exposure pixel-values 501 are stored in respective sections of the data buffer 710, and red pixel-values, green pixel-values, and blue pixel-values of long-exposure pixel-values 602 are stored in respective sections of the data buffer 710.

Step 820 includes, for each of the N subframes and before the step of combining, at least one of (i) denoising, (ii)

reducing fixed pattern noise of, and (iii) clamping the short-exposure low-resolution image and/or the long-exposure low-resolution image. In an example of step 820, image processing routine 721 denoises, reduces fixed pattern noise of, and/or clamps short-exposure low-resolution images 741(1-N) and/or long-exposure low-resolution images 751 (1-N), resulting in short-exposure low-resolution images 742(1-N) and long-exposure low-resolution images 752(1-N), respectively. When video encoder 700 lacks image processing routine 721, images 742 are the same as images 741, and images 752 are the same as images 751.

Step 825 includes, for each of the N subframes, convolving a region of the long-exposure low-resolution image, the region having been at least partly determined by an alpha map of the short-exposure low-resolution image. The convolution kernel may apply a Gaussian blur operation, and may be represented by a m×m convolution matrix, where m is an odd integer that may differ from $\sqrt{N}$ by at most two. In an example of step 825 and for each of the N subframes, alpha mapper 743 generates an alpha map 745 from short-exposure low-resolution image 742, and destreaker 753 convolves a region, based on alpha map 745, of long-exposure low-resolution images 752, which yields destreaked image 755. Alpha map 745 may have a bit depth equal to eight.

Step 830 includes, for each of the N subframes, combining a long-exposure low-resolution image, captured at the long exposure-time, and a short-exposure low-resolution image, captured at the short exposure-time, to yield a subframe residual image. The subframe residual image may a difference between the long-exposure low-resolution image and the short-exposure low-resolution image (scaled to a common exposure time), e.g., a subtraction of one from the other. The combining of step 830 may be a step of linearly combining, such that the subframe residual image is a linear combination of the long-exposure low-resolution image and the short-exposure low-resolution image.

In an example of step 830, residual image generator 722 linearly combines, for each of the N subframes, long-exposure low-resolution image 752 (or destreaked image 755), captured at the long exposure-time, and short-exposure low-resolution image 742, captured at the short exposure-time, to yield subframe residual image 760. The linearly combining of step 830 may be executed on a pixel-by-pixel basis, that is, with corresponding pixels of the long-exposure low-resolution image and the short-exposure low-resolution image.

Step 830 may include at least one of steps 832, 834, and 836. Steps 834 and 836 pertain to a plurality of long-exposure pixel-values of the long-exposure low-resolution image. In the following description of steps 834 and 836, $P_{742}$, $P_{752}$, and $P_{760}$ represent, respectively, pixel-values of short-exposure low-resolution image 742, long-exposure low-resolution image 752, and subframe residual image 760. $P_{742}$, $P_{752}$, and $P_{760}$ are each, for example, two-dimensional arrays of pixel-values, and may be stored in data buffer 710.

Step 832 includes, for each of the N subframes, scaling the long-exposure low-resolution image by dividing each of a plurality of long-exposure pixel-values by a ratio of the long exposure-time to the short exposure-time. In an example of step 832, for each of the N subframes, residual image generator 722 scales long-exposure low-resolution image 752 by dividing each of its pixel-values $P_{752}$ by a ratio of long exposure-time $\tau_2$ to short exposure-time $\tau_1$. Pixel-values of the resulting scaled long-exposure low-resolution image are therefore $$\frac{\tau_1}{\tau_2} P_{752}.$$

Step 834 includes, for each of the N subframes, subtracting the scaled long-exposure low-resolution image from the short-exposure low-resolution image. In an example of step 834, for each of the N subframes, residual image generator 722 generates subframe residual image 760, which has pixel-values $$P_{760} = P_{742} - \frac{\tau_1}{\tau_2} P_{752}.$$

Residual image generator 722 may add a uniform offset $Z_0$ to subframe residual image 760, such that $$P_{760} = P_{742} - \frac{\tau_1}{\tau_2} P_{752} + Z_0.$$

Uniform offset $Z_0$ is, for example, $2^M$, where M is the bit depth of long-exposure pixel-values 602. Bit depth M equals ten, for example.

Step 836 includes, for each of the N subframes, at least one of (i) perceptually encoding the subframe residual image and (ii) block-encoding the subframe residual image. Perceptual encoding may employ a cube-root function, which corresponds to the functional relationship between lightness L* and luminance Y in the CIELAB color space. Near-null residual values may be clamped to reduce noise and increase encoding efficiency. Block-encoding each subframe residual image may allocate more blocks for green pixels than for red or blue pixels. For example, a sixteen-by-sixteen block array may be used for green pixels while respective eight-by-eight block array may be used for red pixels and blue pixels.

In an example of step 836, residual-image encoder 762 perceptually encodes subframe residual image 760 and/or block-encodes subframe residual image 760 for each of the N subframes, which yields encoded subframe residual images 764. Encoded subframe residual images 764 may have a lower bit depth, e.g., M=10, than the subframe residual images 760, which may have bit depth M=12, M=13, or higher.

Step 840 includes combining at least some of the long-exposure low-resolution images from the N subframes to yield a full-frame long-exposure image having a higher resolution than any long-exposure low-resolution image. In an example of step 840, redistributor 754 combines at least two of long-exposure low-resolution images 752(1-N) to yield full-frame long-exposure image 772. In other words, the combining 840 comprises combining a plurality of long-exposure low-resolution images (one from each the N subframes captured during a continuous interval, i.e. interval 420 in FIG. 4) wherein the combined plurality of long-exposure low-resolution images comprises all pixels of the image sensor such that a full-frame long exposure image 772 is formed.

Step 850 includes processing the full-frame long-exposure image by applying thereto an image-processing operation selected from a group consisting of: white balance, demosaicing, lens-shading correction, color transform, gamma correction, and motion-blur filtering ("destreaking"). Such destreaking is useful, for example, when the full-frame long-exposure image includes a blurred image of a relatively fast-moving object. In an example step 850, long-exposure processing routine 774 processes full-frame long-exposure image 772 to generate processed long-exposure video data 775. Processed long-exposure video data 775 may include chroma-subsampled images and may have a bit depth M=8.

Step 850 may also produce metadata, such as metadata 790, associated with the processing thereof. Accordingly, step 850 may include step 852, which includes adding, to the video stream, metadata associated with the image-processing operation of step 850. In an example of step 852, wrapper encoding routine 784 adds metadata 790 into multi-layer video stream 786. Step 852 may also include adding alpha maps 745 to multilayer video stream 786.

Step 860 includes encoding the full-frame long-exposure image into a base layer of the video stream. In an example of step 860, encoding routine 780 encodes processed long-exposure video data 775 into base video stream 781. Base video stream 781 may at least one of: be an eight-bit stream, have UHD resolution, be chroma subsampled (e.g., at a 4:2:2 sampling mode), and have a 30-Hz frame rate. Base video stream 781 may be backwards-compatible with older video decoders, for example, those not equipped to process enhancement video stream 782 produced by, e.g., encoding routine in step 870. In an embodiment of method 800, encoding of base video stream 781 lacks correction of lens distortion and chromatic aberration associated with digital camera 110. Such encoding enables recovery of raw pixel-values of unencoded video data 194.

Step 870 includes encoding at least some of the subframe residual images from the N subframes into an enhancement layer of the video stream. In an example of step 870, encoding routine 780 encodes at least two of encoded subframe residual images 764(1-N) into enhancement video stream 782. Enhancement video stream 782 may at least one of: be a ten-bit stream, have UHD resolution, be encoded as 720p monochrome video, and have a frame rate of 30 Hz, 270 Hz, or a value therebetween. Enhancement video stream 782 may have a higher dynamic range than base video stream 781.

Figure 9:
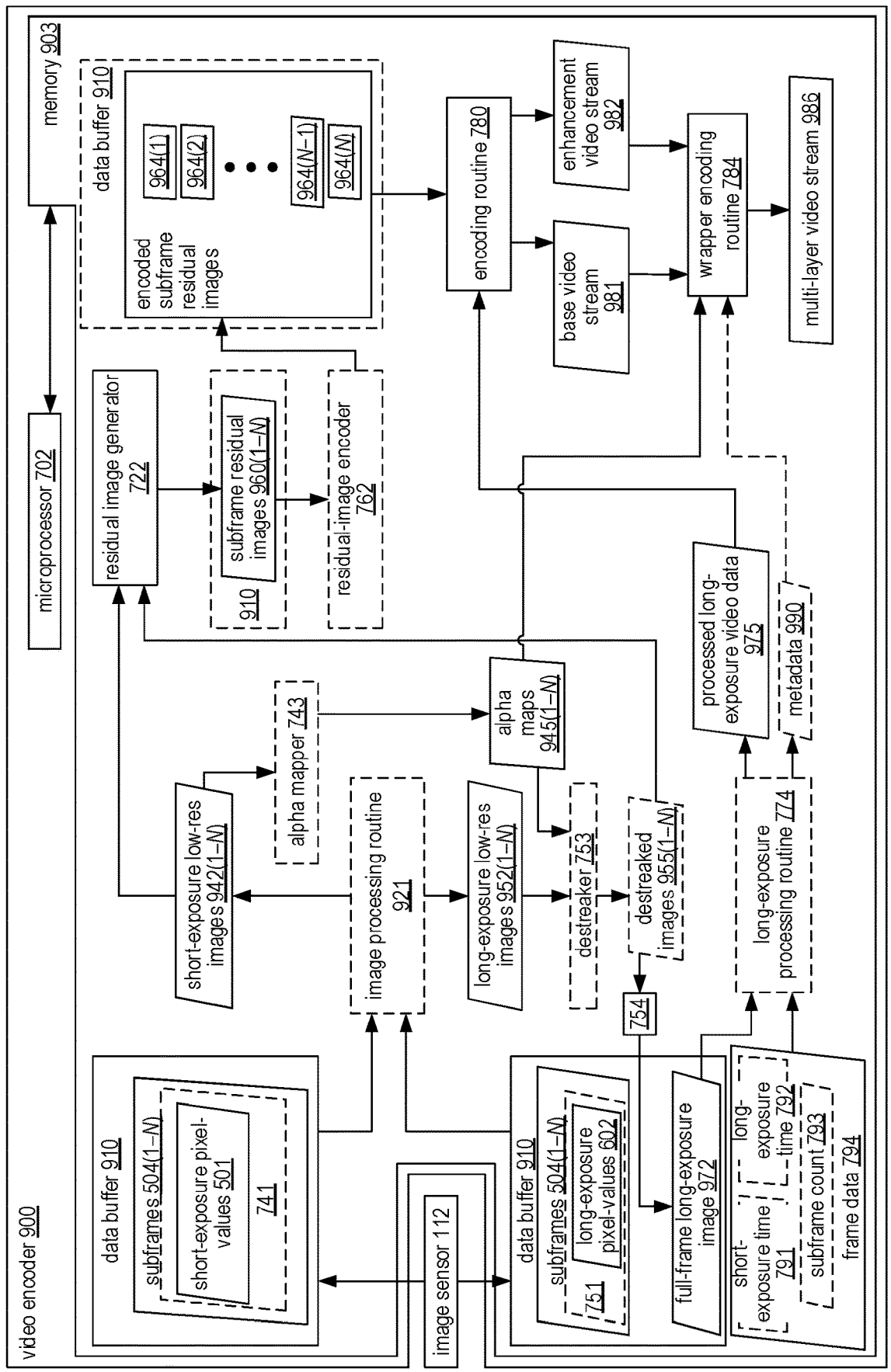
FIG. 9 is a schematic block diagram of a second video encoder configured to generate a multi-layer video stream from unencoded video data received from the image sensor of FIG. 1, in an embodiment.

FIG. 9 is a schematic block diagram of a video encoder 900 configured to generate a multi-layer video stream 986 from unencoded video data 194. Video encoder 900 is an example of video encoder 100, FIG. 1. Video encoder 900 may include at least one of a microprocessor 702 and a memory 903 communicatively coupled thereto. Memory 903 is similar to memory 703. Part or all of memory 903 may be integrated into microprocessor 702.

Memory 903 may include a data buffer 910. Data buffer 910 may have a bit depth M=36 and may be capable of maintaining a 1 GB/second bandwidth. Like data buffer 710, FIG. 7, data buffer 910 may have sufficient bits of precision such that short-exposure pixel-values 501 or long-exposure pixel-values 602 may be scaled by a ratio or exposure times $\tau_1$ and $\tau_2$ without losing precision. Bit depth $M_{910}$ of data buffer 910 may exceed bit depth $M_{104}$ of video frames 104 by at least $\lceil \log_2(\tau_2/\tau_1) \rceil$; bit depth $M_{910}$ may equal $M_{104} + \lceil \log_2(\tau_2/\tau_1) \rceil$.

Data buffer 910 stores subframes 504, which include short-exposure pixel-values 501 and long-exposure pixel-values 602 introduced in FIGS. 5 and 6. Data buffer 910 may also store a plurality of encoded subframe residual images 964 and a full-frame long-exposure image 972. Data buffer 910 may include one or more distinct data buffers such that at least one of subframes 504, encoded subframe residual images 964, and full-frame long-exposure image 972 are stored in a dedicated data buffer. Short-exposure pixel-values 501 and long-exposure pixel-values 602 may be stored in respective distinct data buffers.

Memory 903 may also store software configured to read and transform data stored in data buffer 910. The software includes machine-readable instructions executable by microprocessor 702 to implement functionality of encoder 900. The software may include at least one of an image processing routine 921, residual image generator 722, alpha mapper 743, destreaker 753, residual-image encoder 762, long-exposure processing routine 774, encoding routine 780, and wrapper encoding routine 784. Image processing routine 921 may include one or more image processing routines and/or subroutines.

Memory 903 may also store intermediate data generated by the software in the process of generating a multi-layer video stream 986 from unencoded video data 194. This intermediate data may include at least one of: short-exposure low-resolution images 942, alpha maps 945, long-exposure low-resolution images 952, destreaked images 955, subframe residual images 960, encoded subframe residual images 964, full-frame long-exposure image 972, processed long-exposure video data 975, base video stream 981, enhancement video stream 982, and metadata 990. Memory 903 may also store frame data 794, which may include at least one of short-exposure time 791, long-exposure time 792, and subframe count 793.

Short-exposure pixel-values 501 of a subframe $504(c_{ij})$ may be stored in data buffer 910 as a short-exposure low-resolution image, e.g., short-exposure low-resolution image $741(c_{ij})$. Similarly, long-exposure pixel-values 602 of a subframe $504(c_{ij})$ may be stored in data buffer 910 as a long-exposure low-resolution image, e.g., long-exposure low-resolution image $751(c_{ij})$.

Figure 10:
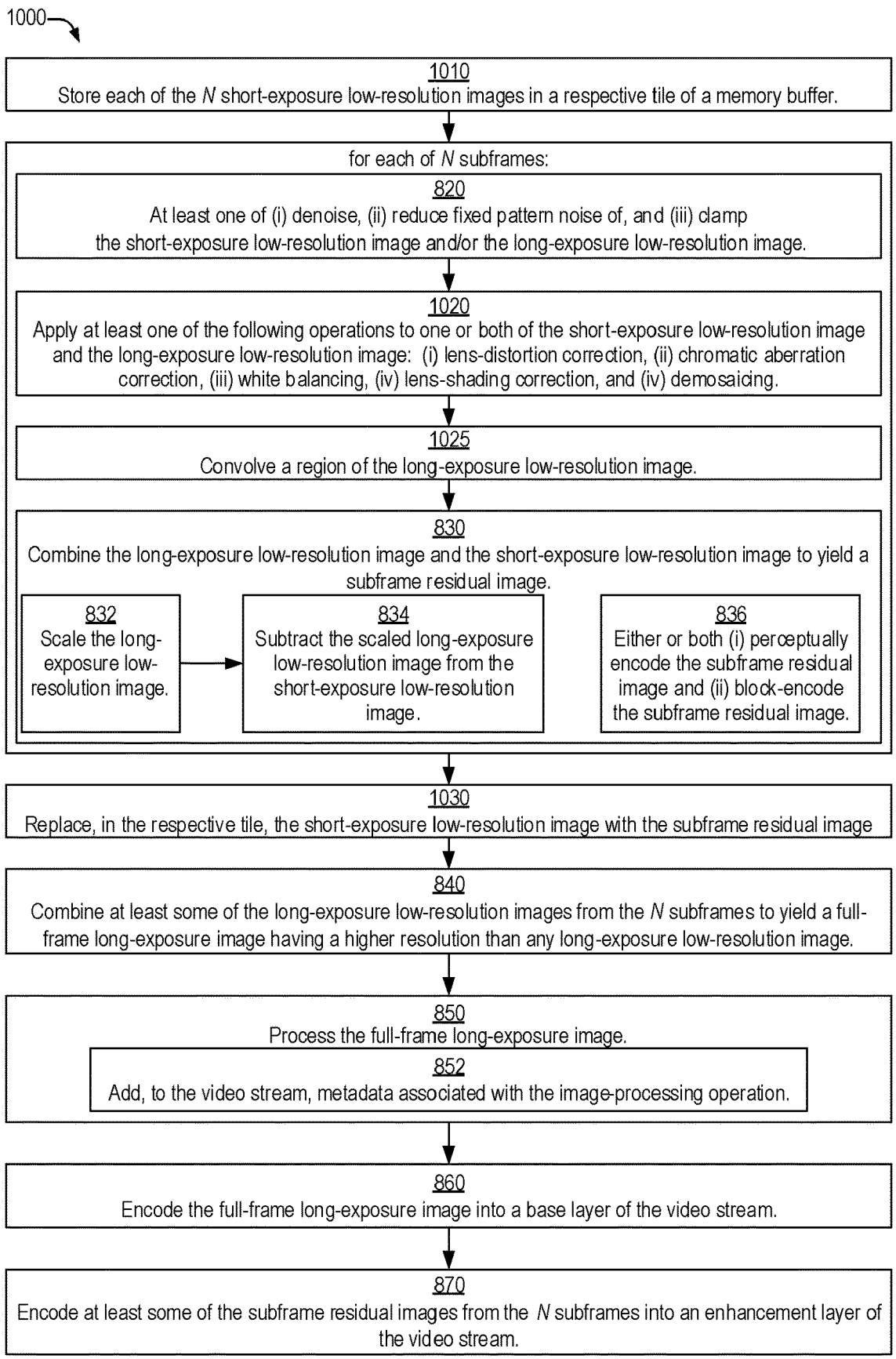
FIG. 10 is a flowchart illustrating a second method for encoding a video stream with the video encoder of FIG. 9, in an embodiment.

FIG. 10 is a flowchart illustrating a method 1000 for encoding a video stream captured by image sensor 112. By combining a base video stream derived from long-exposure images with an enhancement video stream derived from short-exposure images, method 1000 generates an encoded video stream having a temporal resolution of high frame-rate video while lacking the aforementioned cost of increased bandwidth associated with traditional high frame-rate video. Method 1000 may be implemented within one or more aspects of encoder 900, FIG. 9. For example, method 1000 is implemented by microprocessor 702 executing computer-readable instructions of stored in memory 903.

In the following description of method 1000, each pixel 212 of image sensor 112 belongs to one of N subframes each characterized by (i) a same exposure-time sequence (e.g., one of capture timings 404) that includes a short exposure-time 791 alternating with long exposure-time 792, and (ii) a respective temporal offset Δt equal to an integer multiple of short exposure-time 791. Method 1000 includes at least one of steps 1010, 820, 1020, 1025, 830, 1030, 840, 850, 860, and 870.

Step 1010 includes storing each of the N short-exposure low-resolution images in a respective tile of a memory buffer. In an example of step 1010, each of short-exposure low-resolution images 741(1-N) is stored in a respective tile of data buffer 910.

Step 820 is introduced in the description of method 800. In an example of step 820, as implemented in method 1000, image processing routine 921 applies, for each of the N subframes, at least one of the following operations to short-exposure low-resolution images 741(1-N) and/or long-exposure low-resolution images 751(1-N): (i) denoising, (ii) reducing fixed pattern noise of, and (iii) clamping. The operations yield, from images 741 and 751, short-exposure low-resolution images 942 and long-exposure low-resolution images 952, respectively.

Step 1020 includes, for each of the N subframes, applying at least one of the following operations to one or both of the short-exposure low-resolution image and the long-exposure low-resolution image: (i) lens-distortion correction, (ii) chromatic aberration correction, (iii) white balancing, (iv) lens-shading correction, and (iv) demosaicing. In an example of step 1020, image processing routine 921 applies one or more operations (i)-(iv) to at least one of (a) short-exposure low-resolution images 741(1-N), which yields short-exposure low-resolution images 942(1-N) and (b) long-exposure low-resolution images 751(1-N), which yields long-exposure low-resolution images 952(1-N). When method 1000 does not implement step 1010, images 942 are the same as images 741, and images 952 are the same as images 751.

Step 1025 includes, for each of the N subframes, convolving a region of the long-exposure low-resolution image, the region having been at least partly determined by an alpha map of the short-exposure low-resolution image. The convolution kernel may apply a Gaussian blur operation, and may be represented by a m×m convolution matrix, where m is an odd integer that may differ from $\sqrt{N}$ by at most two. In an example of step 1025 and for each of the N subframes, alpha mapper 743 generates an alpha map 945 from short-exposure low-resolution image 942, and destreaker 753 convolves a region, based on alpha map 945, of long-exposure low-resolution images 952, which yields destreaked image 955. Alpha map 945 may have a bit depth equal to eight.

In an example of step 830, residual image generator 722 linearly combines, for each of the N subframes, long-exposure low-resolution image 752 (or destreaked image 955), captured at the long exposure-time, and short-exposure low-resolution image 742, captured at the short exposure-time, to yield subframe residual image 960.

Step 830 is introduced in the description of method 800. Step 830 may include at least one of steps 832, 834, and 836. Steps 834 and 836 pertain to a plurality of long-exposure pixel-values of the long-exposure low-resolution image. In the following description of steps 834 and 836, $P_{942}$, $P_{952}$, and $P_{960}$ represent, respectively, pixel-values of short-exposure low-resolution image 942, long-exposure low-resolution image 952, and subframe residual image 960. $P_{942}$, $P_{952}$, and $P_{960}$ are each, for example, two-dimensional arrays of pixel-values, and may be stored in data buffer 910.

Step 832 includes, for each of the N subframes, scaling the long-exposure low-resolution image by dividing each of a plurality of long-exposure pixel-values by a ratio of the long exposure-time to the short exposure-time. In an example of step 832, as implemented in method 1000, for each of the N subframes, residual image generator 722 scales long-exposure low-resolution image 952 by dividing each of its pixel-values $P_{952}$ by a ratio of long exposure-time $\tau_2$ to short exposure-time $\tau_1$. Pixel-values of the resulting scaled long-exposure low-resolution image are therefore $$\frac{\tau_1}{\tau_2} P_{952}.$$

Step 820 is introduced in the description of method 800. In an example of step 834, for each of the N subframes, residual image generator 722 generates subframe residual image 960, which has pixel-values $$P_{960} = P_{942} - \frac{\tau_1}{\tau_2} P_{952}.$$

Residual image generator 722 may scale subframe residual image 960, for example, by a factor β, where $$\beta = \frac{896}{1024},$$

for example. Residual image generator 722 may also add a uniform offset K to subframe residual image 960, such that $$P_{960} = \beta \left( P_{942} - \frac{\tau_1}{\tau_2} P_{952} \right) + K.$$

Uniform offset K is, for example, $2^{M\pm1}$, where M is the bit depth of video frames 104 and/or long-exposure pixel-values 602. Bit depth M equals ten, for example. In one example K=500. The values of β and K may be determined to ensure that pixel-values $P_{960}$ are non-negative and do not exceed $2^M$, where M is the bit depth of enhancement video stream 982. Factor β may be a function of exposure times $\tau_1$ and $\tau_2$: $\beta = 1 - 2^{-log_2(\tau_2/\tau_1)}$.

Step 836 is introduced in the description of method 800. In an example of step 836, residual-image encoder 762 at least one of (i) perceptually encodes subframe residual image 960 and (ii) block-encodes subframe residual image 960, which yields encoded subframe residual image 964.

Step 1030 includes replacing, in the respective tile of step 1010, the short-exposure low-resolution image with the subframe residual image. In an example of step 1010, each subframe residual image 960($c_{ij}$) replaces short-exposure low-resolution images 741($c_{ij}$) for each subframe index $c_{ij}$ in the range of one to N.

Steps 840 and 850 are introduced in the description of method 800. In an example of step 840, as implemented in method 1000, redistributor 754 combines at least two of long-exposure low-resolution images 952(1-N) to yield full-frame long-exposure image 972. In an example of step 850, as implemented in method 1000, long-exposure processing routine 774 processes full-frame long-exposure image 972 to generate processed long-exposure video data 975.

Step 850 may also produce metadata, such as metadata 790, associated with the processing thereof. Accordingly, step 850 may include step 852, which includes adding, to the video stream, metadata associated with the image-processing operation of step 850. In an example of step 852, as implemented in method 1000, wrapper encoding routine 784 adds metadata 990 into multi-layer video stream 986. Step 852 may also include adding alpha maps 945 to multilayer video stream 986.

Step 860 is introduced in the description of method 800. In an example of step 860, as implemented in method 1000, encoding routine 780 encodes processed long-exposure video data 975 into base video stream 981. Base video stream 981 may be chroma subsampled, e.g., at a 4:2:2 sampling mode. Base video stream 981 may be backwards-compatible with older video decoders, for example, those not equipped to process enhancement video stream 982 produced in step 870 of method 1000.

Step 870 is introduced in the description of method 800. In an example of step 870, as implemented in method 1000, encoding routine 780 encodes at least two of encoded subframe residual images 964(1-N) into enhancement video stream 982. Enhancement video stream 982 may be chroma subsampled, e.g., at a 4:2:2 sampling mode. Enhancement video stream 982 may have a higher dynamic range than base video stream 981.

Features described above as well as those claimed below may be combined in various ways without departing from the scope hereof. The following enumerated examples illustrate some possible, non-limiting combinations. The examples apply to an image sensor that includes a plurality of pixels, each pixel belonging to one of N subframes each characterized by (i) a same exposure-time sequence that includes a short exposure-time alternating with a long exposure-time, and (ii) a respective temporal offset equal to an integer multiple of the short exposure-time.

- (A1) A method for encoding a video stream captured by the image sensor includes, for each of the N subframes, linearly combining a long-exposure low-resolution image, captured at the long exposure-time, and a short-exposure low-resolution image, captured at the short exposure-time, to yield a subframe residual image. The method also includes combining at least some of the long-exposure low-resolution images from the N subframes to yield a full-frame long-exposure image having a higher resolution than any long-exposure low-resolution image. The method also includes (i) encoding the full-frame long-exposure image into a base layer of the video stream, and (ii) encoding at least some of the subframe residual images from the N subframes into an enhancement layer of the video stream.

- (A2) When the short-exposure low-resolution image includes a plurality of short-exposure pixel-values and the long-exposure low-resolution image includes a plurality of long-exposure pixel-values, the method (A1) may further include: (a) storing, in respective sections of a memory buffer, red pixel-values, green pixel-values, and blue pixel-values of the plurality of short-exposure pixel-values, and (b) storing, in respective sections of the memory buffer, red pixel-values, green pixel-values, and blue pixel-values of the plurality of long-exposure pixel-values.

- (A3) In either of the methods (A1)-(A2), and when the long-exposure low-resolution image includes a plurality of long-exposure pixel-values, the step of combining may include: (a) scaling the long-exposure low-resolution image by dividing each of the plurality of long-exposure pixel-values by a ratio of the long exposure-time to the short exposure-time, and (b) subtracting the scaled long-exposure low-resolution image from the short-exposure low-resolution image.

- (A4) In any of the methods (A1)-(A3), the step of combining may be executed on a pixel-by-pixel basis.

- (A5) In any of the methods (A1)-(A4), in the steps of combining, N may be such that (N−1) is an integer closest to the long exposure-time divided by the short exposure-time.

- (A6) Any of the methods (A1)-(A5) may further include, for each of the N subframes and before the step of combining, denoising at least one of the short-exposure low-resolution image and the long-exposure low-resolution image.

- (A7) Any of the methods (A1)-(A6) may further include, for each of the N subframes and before the step of combining, reducing fixed-pattern noise from at least one of the long-exposure low-resolution image and the short-exposure low-resolution image.

- (A8) Any of the methods (A1)-(A7) may further include, for each of the N subframes and before the step of combining, clamping at least one of the long-exposure low-resolution image and the short-exposure low-resolution image.

- (A9) Any of the methods (A1)-(A8) may further include, for each of the N subframes, at least one of (i) perceptually encoding the subframe residual image and (ii) block-encoding the subframe residual image.

- (A10) Any of the methods (A1)-(A9) may further include (a) before the step of encoding the full-frame long-exposure image, processing the full-frame long-exposure image by applying thereto an image-processing operation selected from a group consisting of white balance, demosaicing, lens-shading correction, color transform, gamma correction, and sharpening, and (b) adding, to the video stream, metadata associated with the image-processing operation.

- (A11) Any of the methods (A1)-(A10) may further include, for each of the N subframes and before the step of combining: applying a lens-distortion correction and a chromatic aberration correction to the short-exposure low-resolution image and the long-exposure low-resolution image.

- (A12) Any of the methods (A1)-(A11) may further include, for each of the N subframes and before the step of combining: processing the short-exposure low-resolution image and the long-exposure low-resolution image by applying thereto an image processing operation selected from a group consisting of white balancing, and lens-shading correction, and demosaicing.

- (A13) Any of the methods (A1)-(A12) may further include, for each of the N subframes, convolving a region of the long-exposure low-resolution image, the region having been at least partly determined by an alpha map of the short-exposure low-resolution image.

- (A14) Any of the methods (A1)-(A13) may further include, for each of the N subframes: (a) before the step of combining, storing the short-exposure low-resolution image in a respective tile of a memory buffer; and (b) after the step of combining, replacing, in the respective tile, the short-exposure low-resolution image with the subframe residual image.

- (B1) A video encoder for encoding a video stream includes a memory and a microprocessor communicatively coupled to the memory. The memory stores non-transitory computer-readable instructions and adapted to store image data captured by an image sensor. The image sensor includes a plurality of pixels each belonging to one of N subframes each characterized by (i) a same exposure-time sequence that includes a short exposure-time alternating with a long exposure-time, and (ii) a respective temporal offset equal to an integer multiple of the short exposure-time The microprocessor is adapted to execute the instructions to execute any of the methods (A1)-(A14).

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present method and system, which, as a matter of language, might be said to fall therebetween.

Various aspects of the present invention may be appreciated from the following enumerated example embodiments (EEEs):

1. A method for encoding a video stream captured by an image sensor that includes a plurality of pixels, each pixel belonging to one of N subframes each characterized by (i) a same exposure-time sequence that includes a short exposure-time alternating with a long exposure-time, and (ii) a respective temporal offset equal to an integer multiple of the short exposure-time, the method comprising:

for each of the N subframes, linearly combining a long-exposure low-resolution image, captured at the long exposure-time, and a short-exposure low-resolution image, captured at the short exposure-time, to yield a subframe residual image;

combining at least some of the long-exposure low-resolution images from the N subframes to yield a full-frame long-exposure image having a higher resolution than any long-exposure low-resolution image;

encoding the full-frame long-exposure image into a base layer of the video stream; and encoding at least some of the subframe residual images from the N subframes into an enhancement layer of the video stream.

2. The method of EEE 1, the short-exposure low-resolution image including a plurality of short-exposure pixel-values, the long-exposure low-resolution image including a plurality of long-exposure pixel-values, the method further comprising:

storing, in respective sections of a memory buffer, red pixel-values, green pixel-values, and blue pixel-values of the plurality of short-exposure pixel-values; and storing, in respective sections of the memory buffer, red pixel-values, green pixel-values, and blue pixel-values of the plurality of long-exposure pixel-values.

3. The method of EEE 1 or EEE2, the long-exposure low-resolution image including a plurality of long-exposure pixel-values, and the step of combining including:

scaling the long-exposure low-resolution image by dividing each of the plurality of long-exposure pixel-values by a ratio of the long exposure-time to the short exposure-time, subtracting the scaled long-exposure low-resolution image from the short-exposure low-resolution image.

4. The method of any preceding EEE, the step of combining being executed on a pixel-by-pixel basis.

5. The method of any preceding EEE, in the steps of combining, N being such that (N−1) is an integer closest to the long exposure-time divided by the short exposure-time.

6. The method of any preceding EEE, further comprising, for each of the N subframes and before the step of combining, denoising at least one of the short-exposure low-resolution image and the long-exposure low-resolution image.

7. The method of any preceding EEE, further comprising, for each of the N subframes and before the step of combining, reducing fixed-pattern noise from at least one of the long-exposure low-resolution image and the short-exposure low-resolution image.

8. The method of any preceding EEE, further comprising, for each of the N subframes and before the step of combining, clamping at least one of the long-exposure low-resolution image and the short-exposure low-resolution image.

9. The method of any preceding EEE, further comprising, for each of the N subframes, at least one of (i) perceptually encoding the subframe residual image and (ii) block-encoding the subframe residual image.

10. The method of any preceding EEE, further comprising:

before the step of encoding the full-frame long-exposure image, processing the full-frame long-exposure image by applying thereto an image-processing operation selected from a group consisting of: white balance, demosaicing, lens-shading correction, color transform, gamma correction, and sharpening; and adding, to the video stream, metadata associated with the image-processing operation.

11. The method of any preceding EEE, further comprising, for each of the N subframes and before the step of combining: applying a lens-distortion correction and a chromatic aberration correction to the short-exposure low-resolution image and the long-exposure low-resolution image.

12. The method of any preceding EEE, further comprising, for each of the N subframes and before the step of combining, processing the short-exposure low-resolution image and the long-exposure low-resolution image by applying thereto an image processing operation selected from a group consisting of: white balancing, and lens-shading correction, and demosaicing.

13. The method of any preceding EEE, further comprising, for each of the N subframes, convolving a region of the long-exposure low-resolution image, the region having been at least partly determined by an alpha map of the short-exposure low-resolution image.

14. The method of any preceding EEE, further comprising, for each of the N subframes:

before the step of combining, storing the short-exposure low-resolution image in a respective tile of a memory buffer; and after the step of combining, replacing, in the respective tile, the short-exposure low-resolution image with the subframe residual image.

15. A video encoder for encoding a video stream captured by an image sensor that includes a plurality of pixels each belonging to one of N subframes each characterized by (i) a same exposure-time sequence that includes a short exposure-time alternating with a long exposure-time, and (ii) a respective temporal offset equal to an integer multiple of the short exposure-time, the video encoder comprising:

a memory storing non-transitory computer-readable instructions and adapted to store image data captured by the image sensor;

a microprocessor communicatively coupled to the memory and adapted to execute the instructions to:

for each of the N subframes, combine a long-exposure low-resolution image, captured at the long exposure-time, and a short-exposure low-resolution image, captured at the short exposure-time, to yield a subframe residual image, combine at least some of the long-exposure low-resolution images from the N subframes to yield a full-frame long-exposure image having a higher resolution than any long-exposure low-resolution image, encode the full-frame long-exposure image into a base layer of the video stream, and encode at least some of the subframe residual images from the N subframes into an enhancement layer of the video stream.

16. The video encoder of EEE 15, the short-exposure low-resolution image including a plurality of short-exposure pixel-values, the long-exposure low-resolution image including a plurality of long-exposure pixel-values, the microprocessor being further adapted to execute the instructions to:

store, in respective sections of a memory buffer, red pixel-values, green pixel-values, and blue pixel-values of the plurality of short-exposure pixel-values; and store, in respective sections of the memory buffer, red pixel-values, green pixel-values, and blue pixel-values of the plurality of long-exposure pixel-values.

17. The video encoder of EEE 15 or EEE 16, the long-exposure low-resolution image including a plurality of long-exposure pixel-values, and the instructions to combine including:

scaling the long-exposure low-resolution image by dividing each of the plurality of long-exposure pixel-values by a ratio of the long exposure-time to the short exposure-time, subtracting the scaled long-exposure low-resolution image from the short-exposure low-resolution image.

18. The video encoder of any one of EEEs 15 to 17, N being such that (N−1) is an integer closest to the long exposure-time divided by the short exposure-time.

19. The video encoder of any one of EEEs 15 to 18, the microprocessor being further adapted to execute the instructions to, for each of the N subframes, convolve a region of the long-exposure low-resolution image, the region having been determined by an alpha map of the short-exposure low-resolution image.

20. The video encoder of any one of EEEs 15 to 19, the microprocessor being further adapted to execute the instructions to:

before the step of combining, store the short-exposure low-resolution image in a respective tile of a memory buffer; and after the step of combining, replace, in the respective tile, the short-exposure low-resolution image with the subframe residual image.

The invention claimed is:

1. A method for encoding a video stream captured by an image sensor that includes a plurality of pixels, each pixel belonging to one of N subframes, where the pixels of each subframe are distributed substantially uniformly over an area of the image sensor, each subframe characterized by (i) a same exposure-time sequence that includes a short exposure-time alternating with a long exposure-time, and (ii) a respective temporal offset equal to an integer multiple of the short exposure-time, the method comprising:

for each of the N subframes, linearly combining a long-exposure low-resolution image, captured at the long exposure-time, and a short-exposure low-resolution image, captured at the short exposure-time, to yield a subframe residual image;

combining at least some of the long-exposure low-resolution images from the N subframes to yield a full-frame long-exposure image having a higher resolution than any long-exposure low-resolution image, wherein said at least some of the long-exposure low-resolution images comprise all pixels of the image sensor;

encoding the full-frame long-exposure image into a base layer of the video stream; and encoding at least some of the subframe residual images from the N subframes into an enhancement layer of the video stream.

2. The method of claim 1, the short-exposure low-resolution image including a plurality of short-exposure pixel-values, the long-exposure low-resolution image including a plurality of long-exposure pixel-values, the method further comprising:

storing, in respective sections of a memory buffer, red pixel-values, green pixel-values, and blue pixel-values of the plurality of short-exposure pixel-values; and storing, in respective sections of the memory buffer, red pixel-values, green pixel-values, and blue pixel-values of the plurality of long-exposure pixel-values.

3. The method of claim 1, the long-exposure low-resolution image including a plurality of long-exposure pixel-values, and the step of combining including:

scaling the long-exposure low-resolution image by dividing each of the plurality of long-exposure pixel-values by a ratio of the long exposure-time to the short exposure-time, subtracting the scaled long-exposure low-resolution image from the short-exposure low-resolution image.

4. The method claim 1, the step of combining being executed on a pixel-by-pixel basis.

5. The method claim 1, in the steps of combining, N being such that (N−1) is an integer closest to the long exposure-time divided by the short exposure-time.

6. The method claim 1, further comprising, for each of the N subframes and before the step of combining, denoising at least one of the short-exposure low-resolution image and the long-exposure low-resolution image.

7. The method claim 1, further comprising, for each of the N subframes and before the step of combining, reducing fixed-pattern noise from at least one of the long-exposure low-resolution image and the short-exposure low-resolution image.

8. The method claim 1, further comprising, for each of the N subframes and before the step of combining, clamping at least one of the long-exposure low-resolution image and the short-exposure low-resolution image.

9. The method claim 1, further comprising, for each of the N subframes, at least one of (i) perceptually encoding the subframe residual image and (ii) block-encoding the subframe residual image.

10. The method claim 1, further comprising:

before the step of encoding the full-frame long-exposure image, processing the full-frame long-exposure image by applying thereto an image-processing operation selected from a group consisting of: white balance, demosaicing, lens-shading correction, color transform, gamma correction, and sharpening; and adding, to the video stream, metadata associated with the image-processing operation.

11. The method claim 1, further comprising, for each of the N subframes and before the step of combining: applying a lens-distortion correction and a chromatic aberration correction to the short-exposure low-resolution image and the long-exposure low-resolution image.

12. The method claim 1, further comprising, for each of the N subframes and before the step of combining, processing the short-exposure low-resolution image and the long-exposure low-resolution image by applying thereto an image processing operation selected from a group consisting of: white balancing, and lens-shading correction, and demosaicing.

13. A video encoder for encoding a video stream captured by an image sensor that includes a plurality of pixels each belonging to one of N subframes, where the pixels of each subframe are distributed substantially uniformly over an area of the image sensor, each subframe characterized by (1) a same exposure-time sequence that includes a short exposure-time alternating with a long exposure-time, and (ii) a respective temporal offset equal to an integer multiple of the short exposure-time, the video encoder comprising:
 a memory storing non-transitory computer-readable instructions and adapted to store image data captured by the image sensor;
 a microprocessor communicatively coupled to the memory and adapted to execute the instructions to:
  for each of the N subframes, combine a long-exposure low-resolution image, captured at the long exposure-time, and a short-exposure low-resolution image, captured at the short exposure-time, to yield a subframe residual image,
  combine at least some of the long-exposure low-resolution images from the N subframes to yield a full-frame long-exposure image having a higher resolution than any long-exposure low-resolution image, wherein said at least some of the long-exposure low-resolution images comprise all pixels of the image sensor;
  encode the full-frame long-exposure image into a base layer of the video stream, and encode at least some of the subframe residual images from the N subframes into an enhancement layer of the video stream.

14. The video encoder of claim 13, the short-exposure low-resolution image including a plurality of short-exposure pixel-values, the long-exposure low-resolution image including a plurality of long-exposure pixel-values, the microprocessor being further adapted to execute the instructions to:
 store, in respective sections of a memory buffer, red pixel-values, green pixel-values, and blue pixel-values of the plurality of short-exposure pixel-values; and
 store, in respective sections of the memory buffer, red pixel-values, green pixel-values, and blue pixel-values of the plurality of long-exposure pixel-values.

15. The video encoder of claim 13, the long-exposure low-resolution image including a plurality of long-exposure pixel-values, and the instructions to combine including:
 scaling the long-exposure low-resolution image by dividing each of the plurality of long-exposure pixel-values by a ratio of the long exposure-time to the short exposure-time,
 subtracting the scaled long-exposure low-resolution image from the short-exposure low-resolution image.

* * * * *